United States Patent
Lashkari

(10) Patent No.: US 10,264,354 B1
(45) Date of Patent: Apr. 16, 2019

(54) SPATIAL CUES FROM BROADSIDE DETECTION

(71) Applicant: Cirrus Logic International Semiconductor Ltd., Edinburgh (GB)

(72) Inventor: Khosrow Lashkari, Palo Alto, CA (US)

(73) Assignee: Cirrus Logic, Inc., Austin, TX (US)

(*) Notice: Subject to any disclaimer, the term of this patent is extended or adjusted under 35 U.S.C. 154(b) by 0 days.

(21) Appl. No.: 15/714,356

(22) Filed: Sep. 25, 2017

(51) Int. Cl.
| H04R 3/00 | (2006.01) |
| H04R 1/40 | (2006.01) |
| G10L 25/21 | (2013.01) |
| H04R 3/04 | (2006.01) |

(52) U.S. Cl.
CPC .............. *H04R 3/005* (2013.01); *G10L 25/21* (2013.01); *H04R 1/406* (2013.01); *H04R 3/04* (2013.01); *H04R 2201/401* (2013.01)

(58) Field of Classification Search
CPC ......... G10L 25/21; G10L 25/78; G10L 25/81; G10L 25/84; G10L 25/87; G10L 25/93; G10L 2025/783; G10L 2025/786; G10L 21/0208; G10L 21/0224; G10L 21/0232; G10L 21/0264; G10L 21/0272; G10L 21/028; G10L 21/0308; G10L 21/0364; G10L 2021/02082; G10L 2021/02085; G10L 2021/02087; G10L 2021/02166; H04R 1/40; H04R 1/406; H04R 3/04; H04R 3/005; H04R 2201/40; H04R 2201/401; H04R 2201/403; H04R 2201/405
USPC ........ 381/56, 57, 58, 60, 66, 313, 320, 71.1, 381/71.3, 71.4, 71.11, 71.12, 71.13, 381/71.14, 73.1, 72, 74, 91, 92, 74.1, 381/94.7, 95, 97, 98, 99, 100, 103, 111, 381/112, 113, 114, 115, 119, 121, 122; 704/E21.006, E21.012, E21.013; 700/94
See application file for complete search history.

(56) References Cited

U.S. PATENT DOCUMENTS

| 6,069,961 | A | | 5/2000 | Nakazawa | |
| 6,130,949 | A | * | 10/2000 | Aoki | G10H 3/125 381/94.3 |
| 6,219,645 | B1 | * | 4/2001 | Byers | G10L 15/02 381/91 |
| 9,008,329 | B1 | * | 4/2015 | Mandel | G10K 15/00 381/71.1 |
| 9,069,065 | B1 | * | 6/2015 | Coley | G01S 3/8006 |
| 9,554,203 | B1 | * | 1/2017 | Pavlidi | H04R 1/08 |
| 2001/0031053 | A1 | * | 10/2001 | Feng | H04R 25/407 381/92 |

(Continued)

Primary Examiner — Leshui Zhang
(74) Attorney, Agent, or Firm — Norton Rose Fulbright US LLP

(57) ABSTRACT

Information from microphone signals from a microphone array may be used to identify persistent sources, such as televisions, radios, washing machines, or other stationary sources. Values representative of broadside conditions for each pair of microphone signals are received from the microphone array. By monitoring broadside conditions for microphone pairs, a position of a sound source may be identified. If a sound source is frequently identified with a broadside of the same microphone pair, then that sound source may be identified as a persistent noise source. When a broadside of a pair of microphones is identified with a noise source, a beamformer may be configured to decrease contribution of that pair of microphones to an audio signal formed from the microphone array.

28 Claims, 10 Drawing Sheets

(56) References Cited

U.S. PATENT DOCUMENTS

| | | | | |
|---|---|---|---|---|
| 2003/0147538 A1* | 8/2003 | Elko | | H04R 3/005 381/92 |
| 2004/0072336 A1* | 4/2004 | Parra | | G06K 9/624 435/287.2 |
| 2006/0204019 A1* | 9/2006 | Suzuki | | G10L 21/0272 381/92 |
| 2006/0245601 A1* | 11/2006 | Michaud | | G01S 5/22 381/92 |
| 2009/0175466 A1* | 7/2009 | Elko | | H04R 3/005 381/94.2 |
| 2009/0323977 A1* | 12/2009 | Kobayashi | | H04R 1/406 381/71.8 |
| 2010/0027805 A1* | 2/2010 | Itou | | G10K 11/178 381/71.12 |
| 2010/0142327 A1* | 6/2010 | Kepesi | | G01S 3/786 367/124 |
| 2011/0015898 A1* | 1/2011 | Klippel | | H04R 29/001 702/185 |
| 2011/0022361 A1* | 1/2011 | Sekiya | | G10L 21/0272 702/190 |
| 2012/0128176 A1* | 5/2012 | Acero | | G10L 21/0208 381/92 |
| 2012/0140947 A1* | 6/2012 | Shin | | H04R 3/005 381/92 |
| 2012/0158404 A1* | 6/2012 | Shin | | G10L 21/0208 704/233 |
| 2013/0259243 A1* | 10/2013 | Herre | | G10L 19/02 381/57 |
| 2014/0044279 A1* | 2/2014 | Kim | | G10L 21/0272 381/92 |
| 2014/0241549 A1* | 8/2014 | Stachurski | | H04M 3/568 381/92 |
| 2015/0245152 A1* | 8/2015 | Ding | | H04R 1/406 381/56 |
| 2015/0287422 A1* | 10/2015 | Short | | G01S 7/288 704/205 |
| 2017/0061981 A1* | 3/2017 | Nakadai | | G10L 21/028 |

* cited by examiner

SPATIAL CUES FROM BROADSIDE DETECTION

FIELD OF THE DISCLOSURE

The instant disclosure relates to audio processing. More specifically, portions of this disclosure relate to far-field audio processing.

BACKGROUND

Far-field input in an audio system refers to an audio signal originating a far distance from the microphone(s). As examples, far-field input may be from a talker in a large room, a musician in a large hall, or a crowd in a stadium. Far-field input is contrasted by near-field input, which is an audio signal originating near the microphone(s). An example near-field input is a talker speaking into a cellular phone during a telephone call. Processing audio signals in the far field present additional challenges because the strength of an audio signal decays with the distance of the source from the microphone. The farther a person is from a microphone, the quieter the person's voice is when it reaches the microphone. Additionally, speech is reduced in clarity due to a decrease in the direct-to-reverberant ratio. Furthermore, noise sources can be present, interfering with the desired talker's voice. For example, a radio playing in the room while a person is talking makes the talker difficult to hear. When the talker is closer to the microphone than the interference source is, such as in near-field processing, the talker's voice is higher in amplitude than the interference source. When the talker is far from the microphone, such as in far-field processing, the talker's voice can be of the same or lower amplitude than the interference source. Thus, the person's voice is more difficult to discern in the presence of interference in far-field processing.

One application of far-field technology is in smart home devices. A smart home device is an electronic device configured to receive user speech input, process the speech input, and take an action based on the recognized voice command. An example smart home device in a room is shown in FIG. 1. For example, s living room 100 may include a smart home device 104. The smart home device 104 may include a microphone, a speaker, and electronic components for receiving speech input. Individuals 102A and 102B may be in the room and communicating with each other or speaking to the smart home device 104. Individuals 102A and 102B may be moving around the room, moving their heads, putting their hands over their face, or taking other actions that change how the smart home device 104 receives their voices. Also, sources of noise or interference, audio signals that are not intended to activate the smart home device 104 or that interfere with the smart home device 104's reception of speech from individuals 102A and 102B, may exist in the living room. Some sources of interference include sounds from a television 110A and a radio 110B. Other sources of interference not illustrated may include noises from washing machines, dish washers, sinks, vacuums, microwave ovens, music systems, etc.

The smart home device 104 may incorrectly process voice commands because of the interference sources. Speech from the individuals 102A and 102B may not be recognizable by the smart home device 104 because the amplitude of interference drowns out the individual's speech. In some situations, speech from a noise source, such as television 110A, may be incorrectly recognized as a speech command. For example, a commercial on the television 110A may encourage a user to "buy product X" and the smart home device 104 may process the speech and automatically order product X. Additionally, speech from the individuals 102A and 102B may be incorrectly processed. For example, user speech for "buy backpacks" may be incorrectly recognized as "buy batteries" due to interference from the interference sources.

Shortcomings mentioned here are only representative and are included simply to highlight that a need exists for improved electrical components, particularly for audio processing employed in consumer-level devices, such as audio processing for far-field pickup in smart home devices. Embodiments described herein address certain shortcomings but not necessarily each and every one described here or known in the art. Furthermore, embodiments described herein may present other benefits than, and be used in other applications than, those of the shortcomings described above. For example, similar shortcomings may be encountered in other audio devices, such as audio systems or mobile phones, and embodiments described herein may be used in mobile phones to solve such similar shortcomings as well as other shortcomings.

SUMMARY

Audio processing, including voice command recognition, may be improved by using new techniques for processing microphone signals received by an electronic device. Two or more microphones may be used to record sounds from the environment, and the received sounds processed to obtain information regarding the environment. For example, audio signals from two or more microphones may be processed to spatially identify noise sources. The identified noise sources can be excluded from speech recognition processing to prevent accidental triggering of commands. The identification of the noise sources may also be used to filter out the identified noise sources from the microphone signals to improve the recognition of desired speech.

Other information regarding the environment may also be obtained from the multiple microphone signals. For example, the microphone signals may be processed to identify by inferring the location of a talker. The location of the talker can be used to identify particular talkers and/or other characteristics of particular talkers. For example, the far-field processing may be used to differentiate between two talkers in a room and prevent confusion that may be caused by two active talkers. By improving these and other aspects of audio signal processing, far-field audio processing may be used to enhance smart home devices. Although examples using smart home devices are provided in the described embodiments, the far-field audio processing may enhance operation of other electronic devices, such as cellular phones, tablet computers, personal computers, portable entertainment devices, automobile entertainment devices, home entertainment devices. Furthermore, aspects of embodiments described herein may also be applied to near-field audio processing, and the described embodiments should not be considered to limit the invention to far-field audio processing. For example, embodiments of methods and apparatuses described herein may be applied to other processing involving spatially fixed interference sources and microphone arrays.

Information from microphone signals from a microphone array may be used to identify persistent sources, such as televisions, radios, washing machines, or other stationary sources. Statistics may be computed for each pair of microphone signals received from the microphone array. The statistics may be values representative of broadside conditions for each of the microphone pairs. Broadside conditions for a microphone pair refer to the sound environment closest to a direction related to the position of the two microphones in the pair. By monitoring broadside conditions for each of the microphone pairs, a direction of a sound source may be identified. If a sound source is frequently identified with a broadside of the same microphone pair, then that sound source may be identified as a persistent noise source. When a broadside of a pair of microphones is identified with a noise source, a beamformer may be configured to decrease contribution of that pair of microphones to an audio signal formed from the microphone array. That audio signal may be used to detect voices and/or recognize speech.

Electronic devices incorporating functions for speech recognition, audio processing, audio playback, smart home automation, and other functions may benefit from the audio processing described herein. Hardware for performing the audio processing may be integrated in hardware components of the electronic devices or programmed as software or firmware to execute on the hardware components of the electronic device. The hardware components may include processors or other components with logic units configured to execute instructions. The programming of instructions to be executed by the processor can be accomplished in various manners known to those of ordinary skill in the art. Additionally, or alternatively to integrated circuits comprising logic units, the integrated circuits may be configured to perform the described audio processing through discrete components, such as transistors, resistors, capacitors, and inductors. Such discrete components may be configured in various arrangements to perform the functions described herein. The arrangement of discrete components to perform these functions can be accomplished by those of ordinary skill in the art. Furthermore, discrete components can be combined with programmable components to perform the audio processing. For example, an analog-to-digital converter (ADC) may be coupled to a digital signal processor (DSP), in which the ADC performs some audio processing and the DSP performs some audio processing. The ADC may be used to convert an analog signal, such as a microphone signal, to a digital representation of sounds in a room. The DSP may receive the digital signal output from the ADC and perform mathematical operations on the digital representation to identify and/or extract certain sounds in the room. Such a circuit including analog domain components and digital domain components may be referred to as a mixed signal circuit, wherein "mixed" refers to the mixing of analog and digital processing.

In some embodiments, the mixed signal circuit may be integrated as a single integrated circuit (IC). The IC may be referred to as an audio controller or audio processing because the IC is configured to process audio signals as described herein and is configured to provide additional functionality relating to audio processing. However, an audio controller or audio processor is not necessarily a mixed signal circuit, and may include only analog domain components or only digital domain components. For example, a digital microphone may be used such that the input to the audio controller is a digital representation of sounds and analog domain components are not included in the audio controller. In this configuration, and others, the integrated circuit may have only digital domain components. One example of such a configuration is an audio controller having a digital signal processor (DSP). Regardless of the configuration for processing audio, the integrated circuit may include other components to provide supporting functionality. For example, the audio controller may include filters, amplifiers, equalizers, analog-to-digital converters (ADCs), digital-to-analog converters (DACs), a central processing unit, a graphics processing unit, a radio module for wireless communications, and/or a beamformer. The audio controller may be used in electronic devices with audio inputs and/or outputs, such as music players, CD players, DVD players, Blu-ray players, headphones, portable speakers, headsets, mobile phones, tablet computers, personal computers, set-top boxes, digital video recorder (DVR) boxes, home theatre receivers, infotainment systems, automobile audio systems, smart thermostats, smart lighting control systems, smart appliances (e.g., washer/dryer), smart assistants, and the like.

In embodiments described herein, "far-field audio processing" may refer to audio processing for "far-field" audio sources, where "far-field" refers to a source distance from a microphone array such that the wave front of the sound pressure wave arriving at the array is sufficiently flat. Far-field may also be characterized as the ratio of the energies of the direct component of the sound to its reverberant part. Factors that affect the far-field condition include wavelength, array dimension, and others. Embodiments described herein for far-field audio processing may be applied to other types of audio processing.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
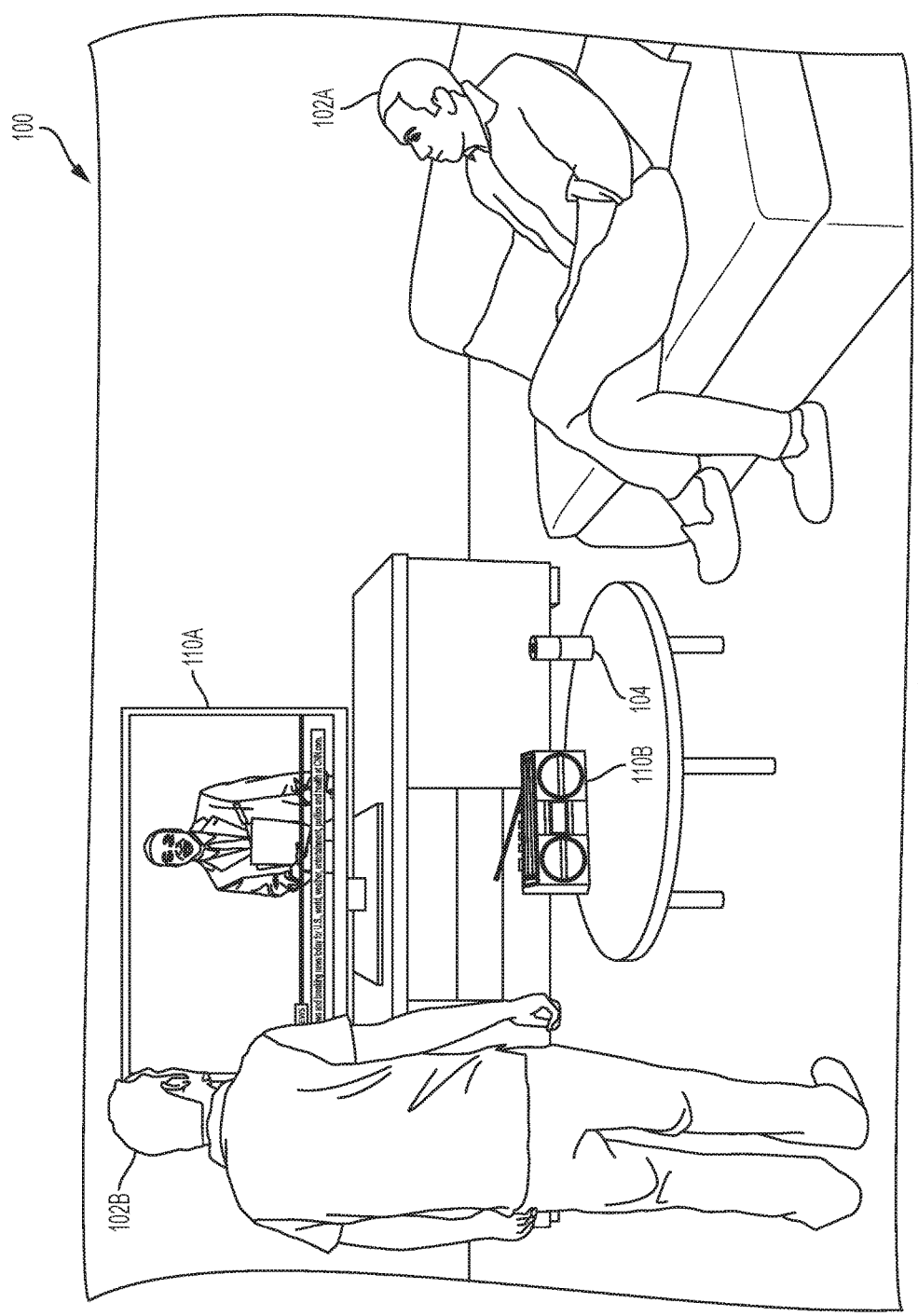
FIG. 1 is an illustration of a conventional smart home device in a room.
Figure 2:
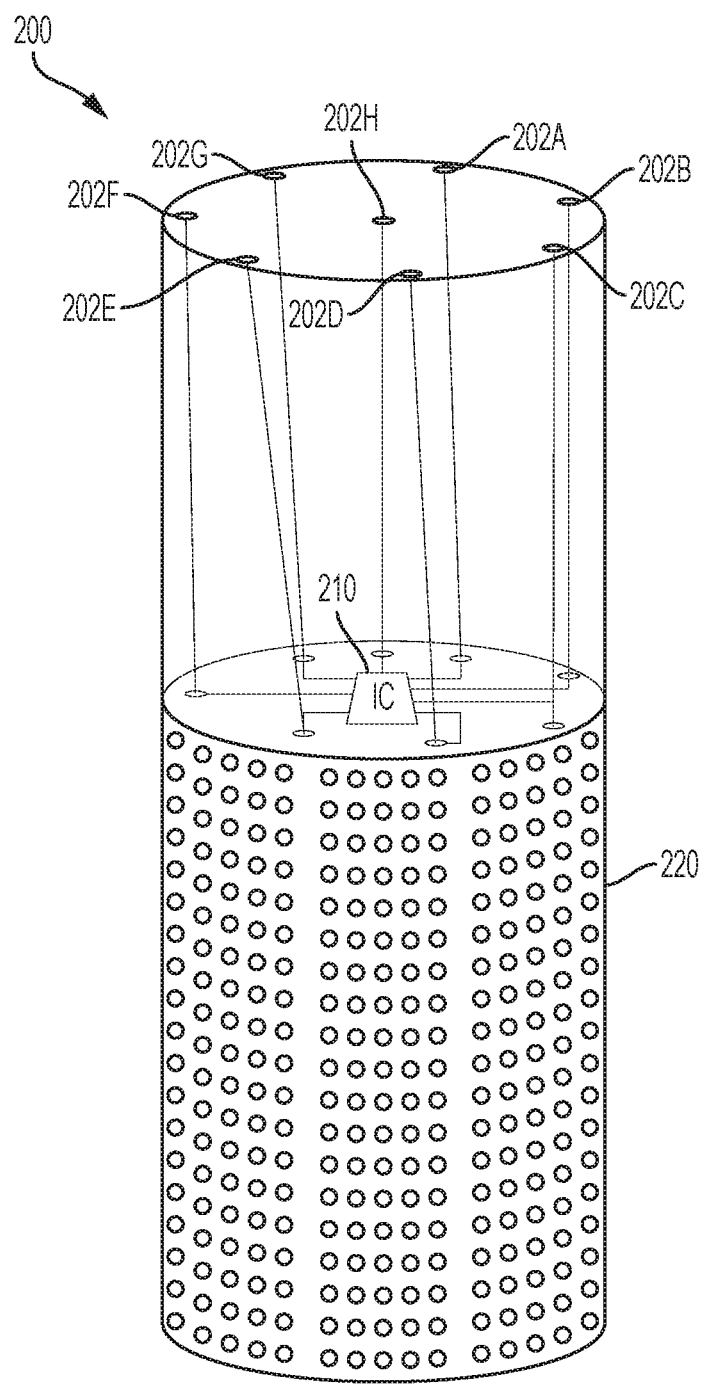
FIG. 2 is a perspective view of a smart home device with components used for audio processing according to some embodiments of the disclosure.

Far-field audio processing may use microphone signals from two or more microphones of an electronic device. An electronic device, such as smart home device 200 (FIG. 2), may include a microphone array 202 including microphones 202A-G. The microphones 202A-G may be any microphone device that transduces pressure changes (such as created by sounds) into an electronic signal. One example device is a miniature microphone, such as a micro-electro-mechanical system (MEMS) microphone. Another example is a digital microphone (DMIC). The microphones 202A-G may be arranged in various configurations on the smart home device 200. The different positions result in each of the microphones 202A-G receiving different audio signals at any moment in time. Despite the difference, the audio signals are related as corresponding to the same environment and the same sound sources in the environment. The similarity and the difference of the audio signals may be used to derive characteristics of the environment and/or the sound sources in the environment.

An integrated circuit (IC) 210 may be coupled to the microphones 202A-G and used to process the signals produced by the microphones 202A-G. The IC 210 performs functions of the far-field audio processing of the invention, such as described in the embodiments of FIG. 7 and FIG. 8. The output of the IC 210 may vary in different embodiments based on a desired application. In smart home device 200, the IC 210 may output a digital representation of audio received through the microphones 202A-G and processed according to embodiments of the invention. For example, processing of the microphone signals may result in a single output audio signal containing an enhanced signal-to-noise ratio that allows for more accurate and reliable recognition of speech from the desired talker. The output audio signal may be encoded in a file format, such as MPEG-1 Layer 3 (MP3) or Advanced Audio Coding (AAC) and communicated over a network to a remote device in the cloud. The remote device may perform speech recognition on the audio file to recognize a command in the speech and perform an action based on the command. The IC 210 may receive an instruction from the remote device to perform an action, such as to play an acknowledgement of the command through a speaker 220. As another example, the IC 210 may receive an instruction to play music, either from a remote stream or a local file, through the speaker 220. The instruction may include an identifier of a station or song obtained through speech recognition performed on the audio signal from the far-field audio processing of the invention.

The microphones 202A-H are illustrated as integrated in a single electronic device in example embodiments of the invention. However, the microphones may be distributed among several electronic devices. For example, in some embodiments, the microphones 202A-H may be in discrete devices around the living room. Those discrete devices may wirelessly communicate with the smart home device 200 through a radio module in the discrete device and the smart home device 200. Such a radio module may be a RF device operating in the unlicensed spectrum, such as a 900 MHz RF radio, a 2.4 GHz or 5.0 GHz WiFi radio, a Bluetooth radio, or other radio modules.

Figure 3:
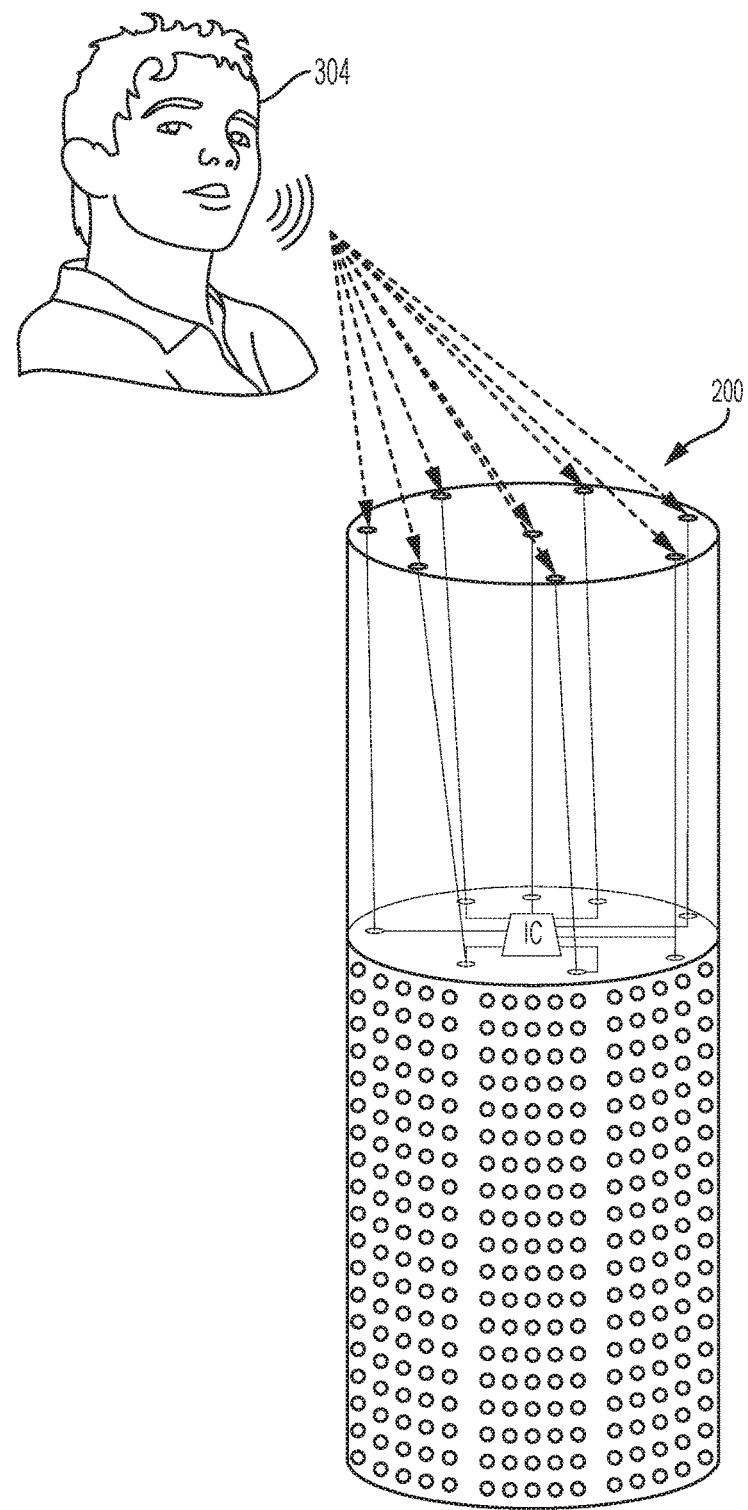
FIG. 3 is an illustration of different times of arrival of sound at two or more microphones according to some embodiments of the disclosure.

Microphones 202A-H sense sound pressure changes in the environment. Each microphone is at a different distance to the source of the sound. The different sound propagation and arrival times are illustrated in FIG. 3. A talker 304 may speak towards the microphones 202A-H. The distance from the talker's 304 mouth to each of the microphones 202A-H is different, resulting in each of the microphones 202A-H with a different time delay. Other than this difference, the audio signals received at each of the microphones 202A-H may be very similar because all of the microphones 202A-H are recording the same sounds in the same environment. This assumes that the sound propagation is in free-field. When reflecting surfaces are present as in a real room, the sound arriving at the microphones includes both direct propagation path and reflections. The microphone signals then include constructive and destructive interference of the full sound propagation from the source to the microphones. As a result, the signals at the different microphones may no longer be simply time-delayed with respect to each other.

Figure 4:
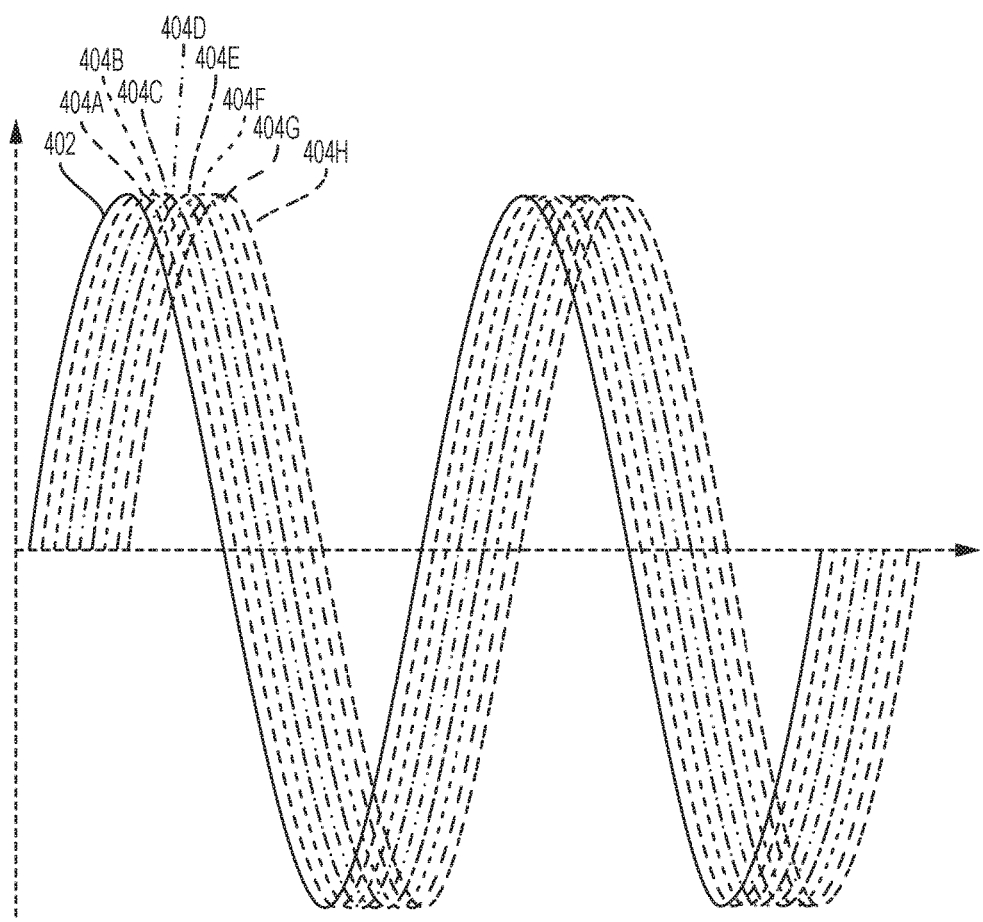
FIG. 4 is a graph illustrating tonal microphone signals from an array of microphones at different locations on an electronic device according to some embodiments of the disclosure.

The similarity and difference in the audio signals received by each of the microphones is reflected in the different microphone inputs received at the IC 210 from each of the microphones 202A-H. FIG. 4 is a graph illustrating microphone signals from an array of microphones at different locations on an electronic device, which may be used in some embodiments of the disclosure. A sound in an environment creates a pressure wave that spreads throughout the environment and decays as the wave travels. An example measurement of the pressure wave at the location of the sound source is shown as signal 402. Each of the microphones 202A-H receive the signal 402 later as the sound travels through the environment and reaches each of the microphones 202A-H. The closest microphone, which may be microphone 202A, receives signal 404A. Signal 404A is shown offset from the original signal 402 by a time proportional to the distance from the source to the microphone 202A. Each of the other microphones 202B-H receives the sound at a slightly later time as shown in signals 404B—H based on each of the microphones 202B-H distance from the source or, relatively, microphone 202A.

Each of the signals 404A-H recorded by microphones 202A-H may be processed by IC 210. IC 210 may filter the signals and calculate signal characteristics, such as phase, between each of the pairs of microphones. For example, an inter-microphone frequency-dependent phase profile may be calculated between the signals 404A and 404B corresponding to microphones 202A and 202B, respectively. The phase profile on the timing difference between the signal 404A and 404B, as governed by the full sound propagation from a source to the microphones (including the direct path, room reverberation, and diffraction effects) and uniquely captures the acoustic path from the source to that microphone pair in the room. The inter-microphone frequency-dependent phase profile may be calculated for other pairs of microphones, such as between 404A-C, 404A-D, 404A-E, 404A-F, 404A-G, and 404A-H, likewise for 404B-C, 404B-D, 404B-E, 404B-F, 404B-G, 404B-H, and likewise for other pairs of microphones. The phase information may be used in far-field audio processing to improve speech recognition, particularly in noisy environments.

Figure 5:
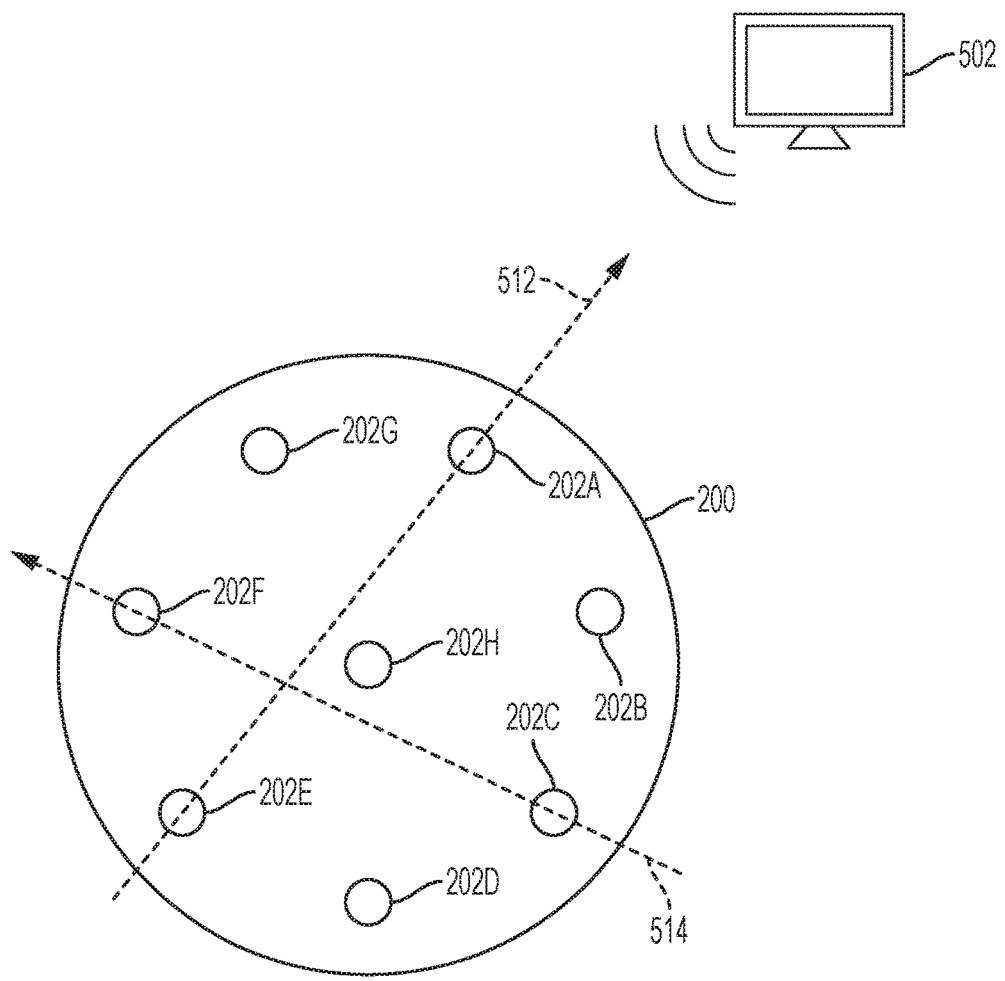
FIG. 5 is an illustration of phase difference for pairs of microphones in the array according to some embodiments of the disclosure.

Processing may include computation and comparison of inter-microphone frequency-dependent phase profiles to identify a relative location. Assuming no reflections, or a near-field source, the pair of microphones aligned along a vector pointing in the direction of the sound source will have a larger inter-microphone phase than the pair of microphones aligned along a vector orthogonal to the direction of the sound source. FIG. 5 is an illustration of the inter-microphone phase for pairs of microphones in the array according to some embodiments of the disclosure. A television 502 may be in a direction along a vector 512 oriented from microphone 202A to microphone 202E. The inter-microphone phase calculated for the pair of microphones 202A and 202E for the television 502 may be the largest phase among any pair of microphones 202A-H. The inter-microphone phase calculated for the pair of microphones 202C and 202F along a vector 514 for the television 502 may be the smallest phase among any pair of the microphones 202A-H. The relative location of other sound sources may likewise be determined around the smart home device 200 by computing inter-microphone frequency-dependent phase profiles. Stationary sources, such as television 502, may appear as a sound source with an approximately constant inter-microphone frequency-dependent phase profile. Moving sources, such as human talkers, may appear as a sound source with a changing inter-microphone frequency-dependent phase profile. Stationary sources may be differentiated from moving sources through processing of the inter-microphone frequency-dependent phase profiles.

Figure 6:
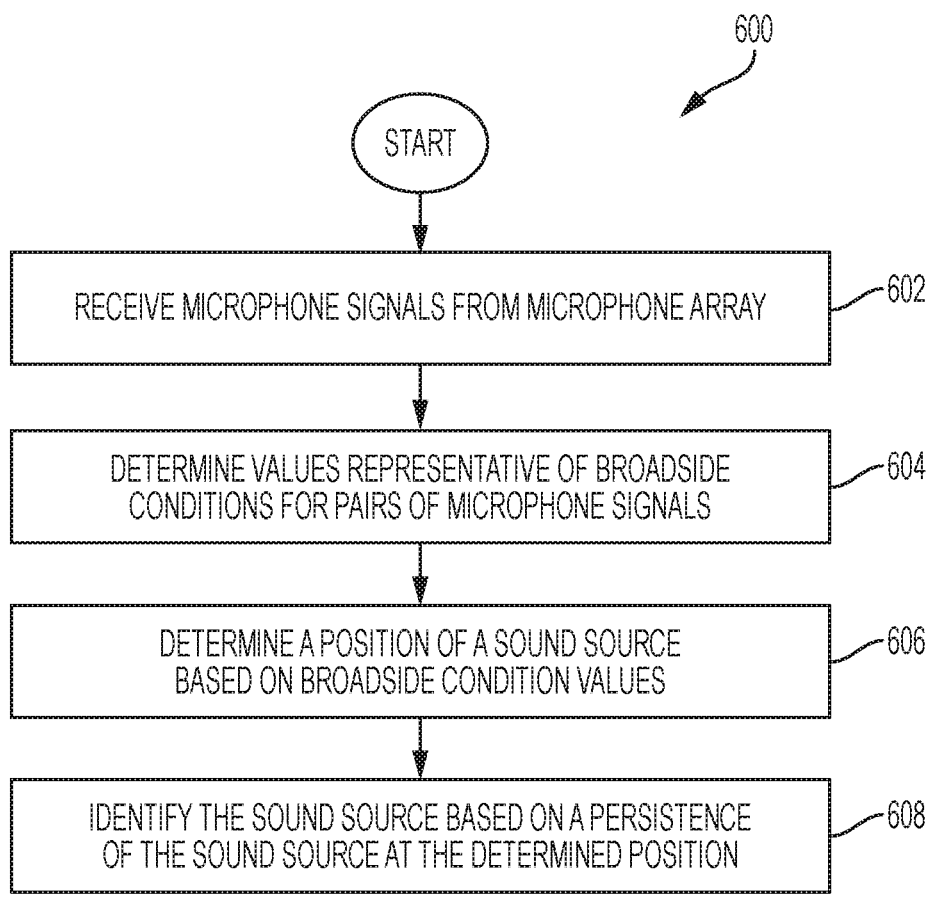
FIG. 6 is a flow chart illustrating an example method for identifying a position of a sound source according to some embodiments of the disclosure.

Broadside conditions for pairs of microphones in a microphone array may be used to identify sound sources. A stationary sound source may be identified by a sound source frequently appearing at a broadside of a particular pair of microphones. A method for identifying positions of sound sources is described with reference to FIG. 6. FIG. 6 is a flow chart illustrating an example method for identifying a position of a sound source according to some embodiments of the disclosure. A method 600 may begin at block 602 with receiving microphone signals from a microphone array. At block 604, the microphone signals may be used to determine values representative of broadside conditions for pairs of microphone signals. Example values may include values based on sums and differences between two signals of a microphone pair. The values may be determined based on a degree of similarity of source-to-microphone impulse responses for microphones signals in each pair of microphone signals. Then, at block 606, a position of a sound source may be determined from the broadside condition values. The position of a sound source may be used for processing of the microphone signals. For example, at block 608, a sound source may be identified as a persistent noise source when the sound source is identified with the same broadside condition at a pair of microphones. A beamformer may be configured to reduce contribution of the noise source to an audio signal formed from the microphone signals. When a position of a talker is identified from the broadside condition values, a beamformer may be configured to increase contribution of the sound source to an audio signal formed from the microphone signals. In some embodiments, the broadside detection may be executing continuously during the receipt of microphone signals. In some embodiments, the broadside detection may be activated when a trigger word is detected. For example, statistics may be determined for broadside pairs at a time the trigger word was recorded to identify a position of the audio source that generated the trigger word. That position information may be used to control a beamformer to improve signal-to-noise ratio (SNR) for the audio source to receive commands that follow the trigger word.

Figure 7:
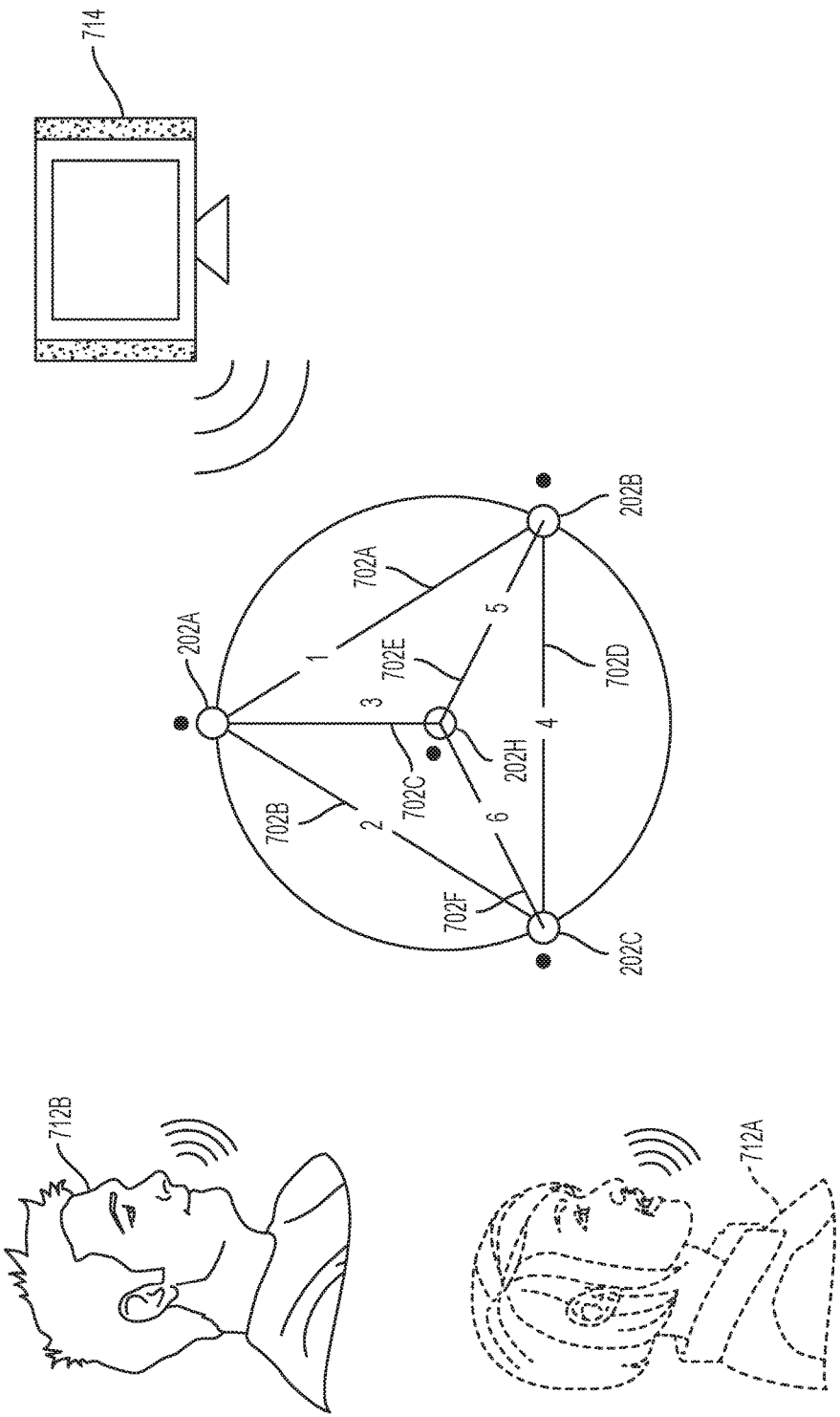
FIG. 7 is a diagram illustrating broadsides for microphones of a microphone array according to some embodiments of the disclosure.

Broadside refers to a direction defined by a vector normal to the line connecting the two microphones. FIG. 7 is a diagram illustrating broadsides for microphones of a microphone array according to some embodiments of the disclosure. A portion of microphone array 202 is shown, including microphones 202A, 202B, 202C, and 202H. The four microphones may be used to form six pairs 702A-F. Microphone pair 702A includes microphones 202A and 202B; microphone pair 702B includes microphones 202A and 202C; microphone pair 702C includes microphones 202A and 202H; microphone pair 702D includes microphones 202B and 202C; microphone pair 702E includes microphones 202B and 202H; microphone pair 702F includes microphones 202C and 202H. Analyzing data for the microphone pairs 702A-F may provide information regarding audio sources 712 and 714.

An example of this analysis can be described using audio sources 712 and 714. Audio source 714 may be a television that has a stationary position with respect to the microphone array 202. The audio source 714 is broadside to the microphone pair 702A. Analysis of the microphone signals can determine this location. When the audio source 714 is determined from this information to be in a fixed location over a long period time, then the audio source 714 can be determined to be stationary. Stationary sources can be classified as noise sources and audio, such as speech, received from the audio source 714 can be ignored. For example, speech played back by the audio source 714 can be ignored rather than processed with speech recognition to recognize audio commands. In contrast, a talker is non-stationary and does not stay broadside to the same microphone pairs. For example, talker at position 712A is broadside to microphone pair 702E. As the talker moves or head turns, the talker's audio is received by different microphones of the array 202 and the broadside condition changes. At position 712B, the talker is broadside to microphone pair 702B. This change in position may be used to determine that the audio source 712 is a talker. A beamformer may be controlled using the broadside information and/or position of the audio source 712 to improve reception of sound from the audio source 712. The improved sound can be passed to speech recognition to recognize commands in the talker's speech.

Figure 8:
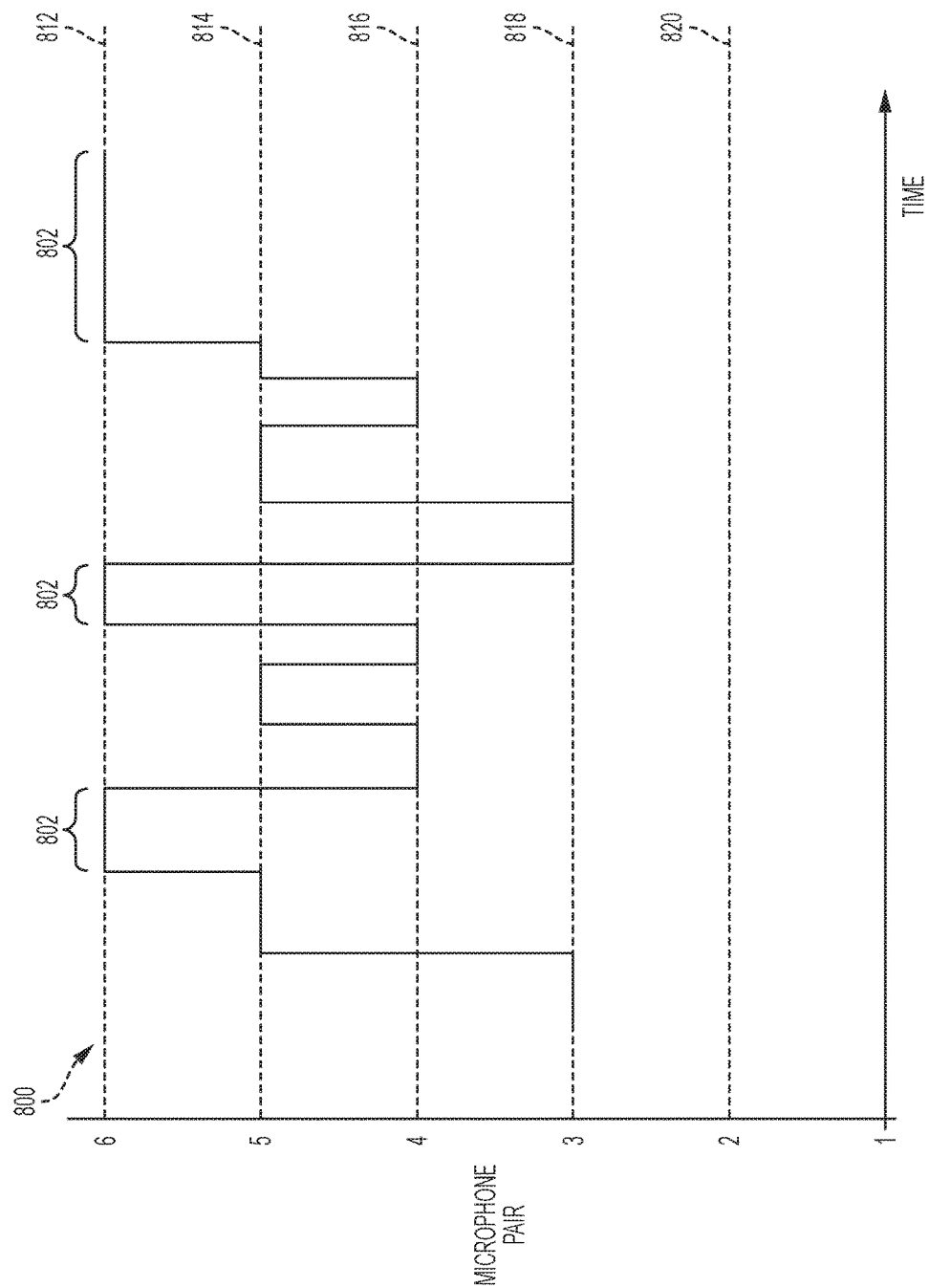
FIG. 8 is a graph illustrating using a broadside with a highest value to classify a persistent source according to some embodiments of the disclosure.

When a talker and a noise source are present simultaneously, the noise source may dominate the broadside conditions because of its stationary location. A value for each broadside may be determined and used to locate noise sources. Because the noise source is stationary over a longer duration of time than a talker, the strongest broadside will continue to return to the broadside nearest the noise source. FIG. 8 is a graph illustrating using a broadside with a highest value to classify a noise source according to some embodiments of the disclosure. A graph 800 illustrates the highest value for a broadside condition over a sample recording time. Lines 812, 814, 816, 818, and 820 correspond to microphone pairs 702A, 702B, 702C, 702D, and 702E, respectively. The graph 800 indicates using lines 812, 814, 816, 818, and 820 when each of the microphone pairs 702A, 702B, 702C, 702D, and 702E, respectively, has the strongest broadside condition. During times 802, the graph 800 shows the microphone pair 702A has the strongest broadside condition. Although other sources are occasionally present, causing the graph 800 to deviate to lines 814 and 816, the graph 800 continues to return to line 812. Thus, an audio source received broadside to microphone pair 702A may be determined to be a stationary source and/or a noise source. The position of other intermittent or moving audio sources, which may be a talker, may also be determined from the broadside condition.

Figure 9:
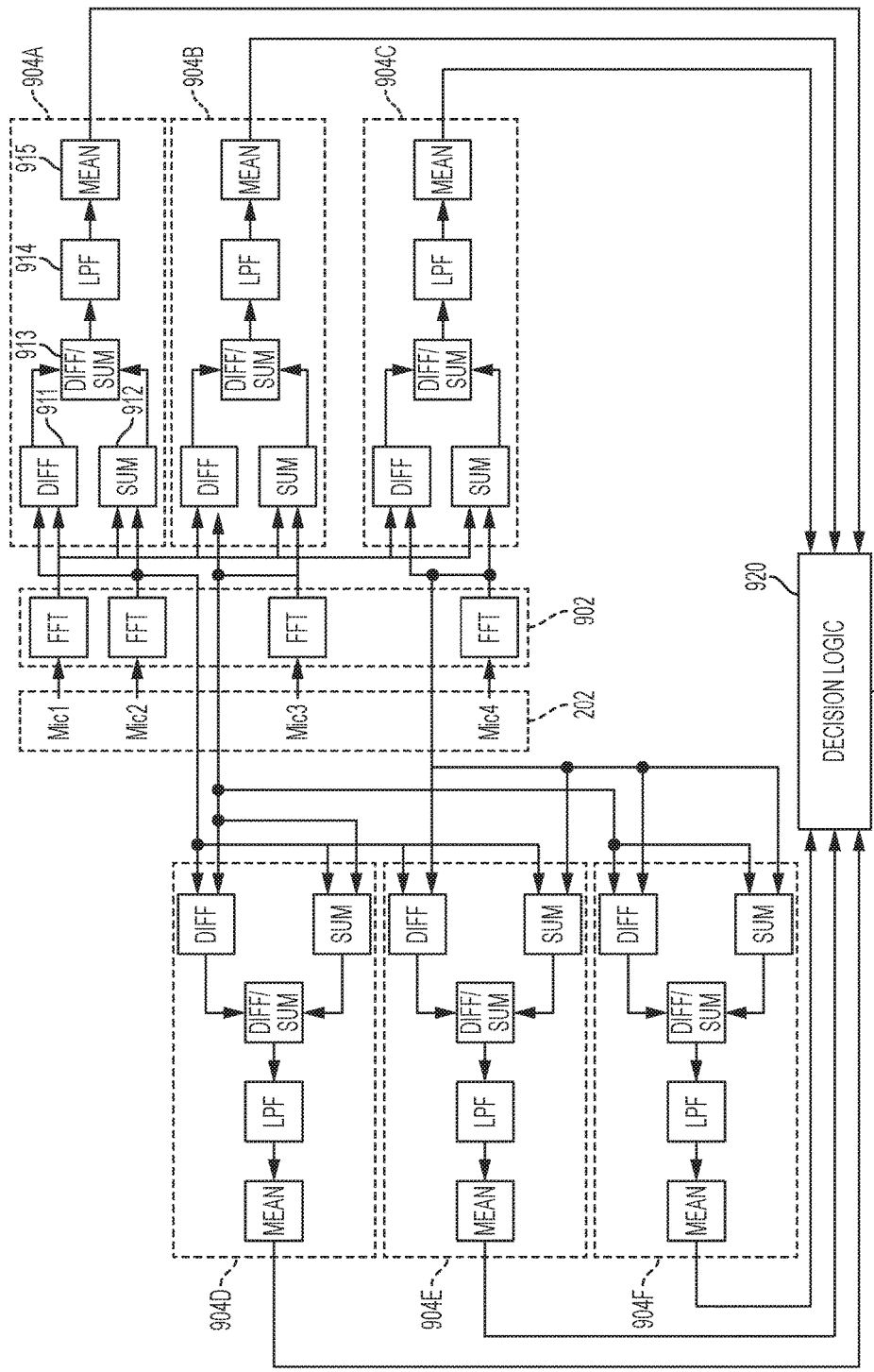
FIG. 9 is a block diagram illustrating computation of values representative of broadside conditions for microphone pairs of a microphone array according to some embodiments of the disclosure.

One technique for calculating a value representative of broadside conditions uses sums and differences between microphone pairs. FIG. 9 is a block diagram illustrating computation of values representative of broadside conditions for microphone pairs of a microphone array according to some embodiments of the disclosure. Input signals from a microphone array 202 may be processed before performing computations by transforming the signals from the time domain into the frequency domain. For example, Fast Fourier Transform (FFT) blocks 902 may produce sub-band values for frequency domains within the microphone signals. In some embodiments, the time domain signals may be processed without transformation into the frequency domain. In some configurations for these embodiments, the values representative of broadside conditions may be calculated by determining difference beams and sum beams in a time domain for each pair of microphone signals. Then, a ratio of energies of the difference beams to energies of the sum beams for each pair of microphone signals may be determined for the broadside conditions. Alternatively, a ratio of energies of the sum beams to energies of the difference beams for each pair of microphone signals may be determined for the broadside conditions.

Parallel processing blocks 904A-F of FIG. 9 are organized to process transformed signals and may be organized to process transformed signals for pairs of microphones. Although six blocks are shown for processing all possible pairs from four microphone signals, not all microphone pairs may be processed. Furthermore, different numbers of microphone signals are possible based on the size of the microphone array. Although replicated blocks are shown for each of the processing blocks 904A-F, the processing may be performed by a single processor.

Each of the processing blocks 904A-F may perform mathematical operations on the transformed microphone signals to obtain values representative of broadside conditions for the microphone pair corresponding to the processing block. Processing block 904A calculates a representative value for broadside conditions of microphone pair 702A; processing block 904B calculates a representative value for broadside conditions of microphone pair 702B; processing block 904C calculates a representative value for broadside conditions of microphone pair 702C; processing block 904D calculates a representative value for broadside conditions of microphone pair 702D; processing block 904E calculates a representative value for broadside conditions of microphone pair 702E; and processing block 904F calculates a representative value for broadside conditions of microphone pair 702F. One example of a processing block 904A-F calculates sums and differences between the microphone signal pairs. For example, processing block 904A may include a difference block 911 and sum block 912. Each of the blocks 911 and 912 may subtract or add the transformed representations of the microphone signals for microphones 202A and 202B by subtracting or adding frequency sub-band values. In some embodiments, only a subset of frequency bins for each pair of microphone signals is used for determining broadside conditions. This subset processing may provide similar results as processing the entire set of frequency bins while saving computational time and saving power.

The processing continues with a ratio block 913 that calculates a ratio of the sum beams and difference beams. In some embodiments, the ratio is a ratio of the difference of block 911 to the sum of block 912. In some embodiments, the ratio is a ratio of the sum of block 912 to the difference of block 911. This ratio may represent a ratio of energies of the difference beams and energies of the sum beams for each pair of microphone signals, and be an approximate signal-to-noise ratio (SNR) for the microphone pair. Low-pass filter (LPF) block 914 applies a low-pass filter ("LPF") to the ratio output from block 913. The LPF block 914 may smooth the ratio over time. Mean block ("MEAN") 915 calculates a mean of the frequency sub-bands after smoothing by LPF block 914. Mean block 915 receives a plurality of values representing the smoothed ratio of the microphone pairs at a plurality of frequency sub-bands. Mean block 915 outputs a single value representative of broadside conditions for the microphone pair. The representative value for each of the microphone pairs is provided to decision logic block 920. Block 920 may process the representative values to provide information regarding sound sources in the environment. For example, logic block 920 may select a lowest value of the processing block 904A-F outputs to identify a microphone pair closest to an audio source received by the microphone array 202. The logic block 920 may output an indication of the position of the audio source by outputting an indicator of the microphone pair with the lowest broadside statistics value. The logic block 920 may also implement other functionality. For example, the logic block 920 may include voice activity detection (VAD) logic to determine if speech or noise is present in the audio source. With this functionality, the logic block 920 may output a 0 value for no detection, a 1 value for speech detection, or a −1 value for noise detection. The noise or speech determination may be used by a beamform controller to determine whether to adjust control parameters, such as step size, for noise signals or speech signals.

Figure 10:
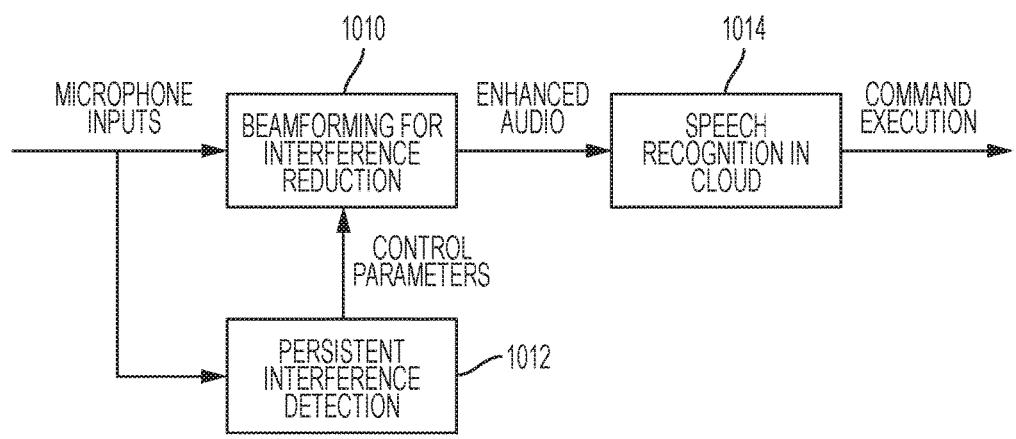
FIG. 10 is a block diagram illustrating an example beamformer according to some embodiments of the disclosure.

The functionality described for detecting interference sources may be incorporated into a beamformer controller of an audio controller integrated circuit or other integrated circuit. The beamform controller may use an interference determination, such as an interference detection statistic, to modify control parameters for a beamformer that processes audio signals from the microphone array. FIG. 10 is a block diagram illustrating an example beamformer according to some embodiments of the disclosure. Microphones 202A-H provide microphone inputs to a beamformer 1010. The beamformer 1010 operates using control parameters, such as a voice step size and a noise step size, based on persistent interference detection at block 1012. Enhanced audio produced by the beamformer 1010 may be sent to a remote system in cloud 1014? for speech recognition or other processing. The cloud 1014 produces a command from the enhanced audio and may execute the command or send the command back to the smart home device for execution.

The schematic flow chart diagram of FIG. 6 is generally set forth as a logical flow chart diagram. Likewise, other operations for the circuitry are described without flow charts herein as sequences of ordered steps. The depicted order, labeled steps, and described operations are indicative of aspects of methods of the invention. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Furthermore, the logic circuitry may be configured as a general-purpose processor (e.g., CPU or DSP) capable of executing instructions contained in software. The firmware and/or software may include instructions that cause the processing of signals described herein to be performed. The circuitry or software may be organized as blocks that are configured to perform specific functions. Alternatively, some circuitry or software may be organized as shared blocks that can perform several of the described operations. In some embodiments, the integrated circuit (IC) that is the controller may include other functionality. For example, the controller IC may include an audio coder/decoder (CODEC) along with circuitry for performing the functions described herein. Such an IC is one example of an audio controller. Other audio functionality may be additionally or alternatively integrated with the IC circuitry described herein to form an audio controller.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

The described methods are generally set forth in a logical flow of steps. As such, the described order and labeled steps of representative figures are indicative of aspects of the disclosed method. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, where general purpose processors are described as implementing certain processing steps, the general purpose processor may be a digital signal processors (DSPs), a graphics processing units (GPUs), a central processing units (CPUs), or other configurable logic circuitry. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving a plurality of microphone signals comprising recordings of one or more sound sources from a plurality of locations;
   determining a plurality of values representative of broadside conditions for each pair of microphone signals of the plurality of microphone signals; and
   determining a position of a sound source of the one or more sound sources based, at least in part, on the plurality of values,
   wherein the step of determining the values representative of broadside conditions comprises determining a degree of similarity of source-to-microphone impulse responses for microphone signals in each pair of microphone signals.

2. The method of claim 1, wherein the step of determining the position comprises determining one pair of microphone signals with a value of broadside condition indicating a highest broadside condition of the plurality of values.

3. The method of claim 1, further comprising recording the plurality of values representative of broadside conditions over a period of time, wherein the step of determining the position of the sound source comprises determining a most persistent broadside pair of microphone signals during the period of time.

4. The method of claim 1, wherein the step of determining the values representative of broadside conditions comprises determining difference beams and sum beams in a time domain for each pair of microphone signals.

5. The method of claim 4, wherein the step of determining the values representative of broadside conditions comprises determining a ratio of energies of the difference beams to energies of the sum beams for each pair of microphone signals.

6. The method of claim 4, wherein the step of determining the values representative of broadside conditions comprises determining a ratio of energies of the sum beams to energies of the difference beams for each pair of microphone signals.

7. The method of claim 1, wherein the step of determining the values representative of broadside conditions comprises determining difference beams and sum beams in a frequency domain for each pair of microphone signals.

8. The method of claim 7, wherein the step of determining the values representative of broadside conditions comprises determining a ratio of energies of the difference beams to energies of the sum beams in frequency bins for each pair of microphone signals.

9. The method of claim 7, wherein the step of determining the values representative of broadside conditions comprises determining a ratio of energies of the sum beams to energies of the difference beams in frequency bins for each pair of microphone signals.

10. The method of claim 7, wherein the step of determining the values representative of broadside conditions comprises determining a ratio of energies of the difference beams to energies of the sum beams in a subset of frequency bins for each pair of microphone signals.

11. The method of claim 7, wherein the step of determining the values representative of broadside conditions comprises determining a ratio of energies of the sum beams to energies of the difference beams in a subset of frequency bins for each pair of microphone signals.

12. The method of claim 1, further comprising outputting parameters to a beamformer that modify the processing of the plurality of microphone signals by the beamformer based on the determined position of the sound source.

13. The method of claim 12, wherein the step of outputting parameters comprises outputting parameters to reduce a magnitude of the sound source in an output audio signal when the sound source is identified as an interference source.

14. The method of claim 13, further comprising identifying the sound source as an interference source based on the position of the sound source determined from the broadside conditions indicating that the sound source is in a fixed location.

15. An apparatus, comprising:
an audio controller configured to perform steps comprising:
receiving a plurality of microphone signals comprising recordings of a sound source from a plurality of locations;
determining a plurality of values representative of broadside conditions for each pair of microphone signals of the plurality of microphone signals; and
determining a position of the sound source based, at least in part, on the plurality of values,
wherein the step of determining the values representative of broadside conditions comprises determining a degree of similarity of source-to-microphone impulse responses for microphone signals in each pair of microphone signals.

16. The apparatus of claim 15, wherein the audio controller is further configured to perform steps comprising recording the plurality of values representative of broadside conditions over a period of time, wherein the step of determining the position of the sound source comprises determining a most persistent broadside pair of microphone signals during the period of time.

17. The apparatus of claim 15, wherein the audio controller is further configured to perform steps comprising determining the values representative of broadside conditions comprises determining difference beams and sum beams in a time domain for each pair of microphone signals.

18. The apparatus of claim 15, wherein the audio controller is configured to determine values representative of broadside conditions by determining difference beams and sum beams in a frequency domain for each pair of microphone signals.

19. The apparatus of claim 18, wherein the audio controller is configured to determine values representative of broadside conditions by determining a ratio of energies of the sum beams to energies of the difference beams in a subset of frequency bins for each pair of microphone signals.

20. The apparatus of claim 15, wherein the audio controller is further configured to perform steps comprising outputting parameters to a beamformer that modify the processing of the plurality of microphone signals by the beamformer based on the determined position of the sound source.

21. The apparatus of claim 20, wherein the audio controller is further configured to perform steps comprising outputting parameters to reduce a magnitude of the sound source in an output audio signal when the sound source is identified as an interference source.

22. The apparatus of claim 21, wherein the audio controller is further configured to perform steps comprising identifying the sound source as an interference source based on the position of the sound source determined from the broadside conditions indicating that the sound source is in a fixed location.

23. An apparatus, comprising:
an input node for receiving a plurality of time-domain microphone signals from a plurality of microphones of a microphone array;
a transformation block configured to transform the plurality of time-domain microphone signals to a plurality of frequency-domain microphone signals;
a processing block configured to process the plurality of frequency-domain microphone signals in pairs by determining difference beams and sum beams corresponding to pairs of the plurality of frequency-domain microphone signals to determine a plurality of values representative of broadside conditions for the pairs of frequency-domain microphone signals; and
a logic block configured to determine a position of a sound source of one or more of the plurality of time-domain microphone signals based, at least in part, on the plurality of values.

24. The apparatus of claim 23, wherein the processing block comprises:
a difference block configured to determine a difference between a pair of frequency-domain microphone signals;
a sum block configured to determine a sum between a pair of frequency-domain microphone signals; and a ratio block configured to determine a ratio between an output of the difference block and an output of the sum block.

25. The apparatus of claim 24, wherein the processing block further comprises:
a low-pass filter configured to smooth an output of the ratio block; and
a mean block configured to output a mean of output from the low-pass filter.

26. The apparatus of claim 23, wherein the logic block is configured to identify a sound source as speech or noise based, at least in part, on the plurality of values representative of broadside conditions.

27. The apparatus of claim 23, wherein the logic block is configured to determine a most persistent broadside pair of microphone signals during a period of time as a noise source.

28. The apparatus of claim 23, wherein the logic block is configured to output parameters to a beamformer that modify the processing of the plurality of time-domain microphone signals by the beamformer based on the determined position of the sound source.

* * * * *